(12) United States Patent
Moriyama et al.

(10) Patent No.: US 6,646,756 B2
(45) Date of Patent: *Nov. 11, 2003

(54) PRINTING APPARATUS AND METHOD WHICH CONTROLS DRIVING OF A PRINTING HEAD ACCORDING TO RECEIVED DATA

(75) Inventors: Jiro Moriyama, Kawasaki (JP); Minako Kato, Yokohama (JP)

(73) Assignee: Canon Kabushki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,402

(22) Filed: Jun. 19, 1998

(65) Prior Publication Data

US 2002/0001098 A1 Jan. 3, 2002

(30) Foreign Application Priority Data

Jun. 20, 1997 (JP) ............................................. 9/164547
Jun. 15, 1998 (JP) ........................................... 10/167473

(51) Int. Cl.[7] .............................................. G06K 15/00
(52) U.S. Cl. ............................... 358/1.15; 358/426.03; 358/426.11
(58) Field of Search .................. 358/1.1–1.9, 1.11–1.18, 358/296, 468, 426.03, 426.07, 426.11, 426.13, 426.14, 426.15, 426.16; 347/3, 14

(56) References Cited

U.S. PATENT DOCUMENTS

| | | | |
|---|---|---|---|
| 4,290,138 A | * 9/1981 | Bare et al. ..................... 371/29 |
| 4,313,124 A | 1/1982 | Hara ...................... 346/140 R |
| 4,345,262 A | 8/1982 | Shirato et al. .......... 346/140 R |
| 4,459,600 A | 7/1984 | Sato et al. ............... 346/140 R |
| 4,463,359 A | 7/1984 | Ayata et al. ................. 346/1.1 |
| 4,558,333 A | 12/1985 | Sugitani et al. ......... 346/140 R |
| 4,723,129 A | 2/1988 | Endo et al. .................. 346/1.1 |
| 4,740,796 A | 4/1988 | Endo et al. .................. 346/1.1 |
| 5,223,937 A | * 6/1993 | Moriguchi et al. ......... 358/296 |
| 5,477,246 A | * 12/1995 | Hirabayashi et al. ......... 347/12 |
| 5,576,758 A | * 11/1996 | Arai et al. ................... 348/220 |
| 5,594,478 A | * 1/1997 | Matsubara et al. ........... 347/41 |
| 5,731,823 A | * 3/1998 | Miller et al. .................... 347/5 |
| 5,734,753 A | * 3/1998 | Bunce ........................ 382/237 |
| 5,913,018 A | * 6/1999 | Sela .......................... 358/1.17 |
| 5,949,450 A | * 9/1999 | Elley et al. .................... 347/40 |
| 6,208,689 B1 | * 3/2001 | Ohira et al. ........... 375/240.12 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 63-254050 | 10/1988 |

* cited by examiner

*Primary Examiner*—Gabriel Garcia
*Assistant Examiner*—King Y. Poon
(74) *Attorney, Agent, or Firm*—Fitzpatrick, Cella, Harper & Scinto

(57) ABSTRACT

A distinction apparatus of a printing apparatus distinguishes data compression rate according to each of the data transferred from a host computer, and a mode selection apparatus selects a printing mode according to slow printing velocity when data compression rate is low and selects a printing mode according to fast printing velocity when data compression rate is high, and then the printing head can be controlled under printing velocity according to the selected printing mode.

37 Claims, 10 Drawing Sheets

PRINTING APPARATUS AND METHOD WHICH CONTROLS DRIVING OF A PRINTING HEAD ACCORDING TO RECEIVED DATA

This application is based on Japanese Patent Application No. 164,547/1997 filed Jun. 20, 1997 and Japanese Patent Application No. 167,473/1998 filed Jun. 15, 1998, the contents of which are incorporated hereinto by reference.

BACKGROUND OF THE INVENTION

FIELD OF THE INVENTION

The present invention relates to a printing apparatus and a printing method in which ink dot adheres to the printing medium to form a character or an image, and especially relates to an ink-jet printing apparatus and an ink-jet printing method equipped with a plurality of printing modes according to different printing quality.

DESCRIPTION OF THE RELATED ART

Heretofore, an ink-jet printing method is favorable for low noise, low running cost, downsizing with ease, and coloring with ease.

A color ink-jet printing method performs color printing by being equipped with three primary color inks of cyan (C), magenta (M), and yellow (Y) or four kinds of these three primary color inks and black (B).

In the conventional ink-jet printing method, it is preferable to use an especial paper having an ink absorption layer for forming an image without bleeding between inks.

Recently, by improving ink, a method which has the printing properties of a general paper used in large quantities by a copier, and the like, has been made for practical use.

However, printing quality according to a general paper has been still inadequate, because ink adherent to printing medium bleeds. Therefore, it is difficult to similarly get image quality between printing for a general paper and printing for an especial paper.

Judging from the use of a printing apparatus, it is desirable that both printing modes are compatible by using the same printing apparatus. Namely, one printing mode is faster printing velocity in spite of lower printing quality and the other printing mode is higher printing quality in spite of slower printing velocity.

Therefore, to improve printing quality, Japanese Patent Application Laying-open No. 63-254050 proposes a method in which multi-pass printing performs different scanning according to each of adjacent boundary dots. However, this multi-pass printing method has a defect in the increase of the number of scannings to decrease printing velocity.

There is a method which proposes high printing quality by improving printing resolution. For example, 360 dpi (dot per inch) is higher printing resolution than 180 dpi and 720 dpi is higher printing resolution than 360 dpi to improve printing quality. However, the high resolution printing method has a defect in which data content increases and data transmission velocity decreases to decrease printing velocity.

To improve above defect, there is a compressed data transmission method. This method performs processes in which a host computer compresses data for transferring and the compressed data is transferred from the host computer to a printing apparatus and then the compressed data is developed. However, this compressed data transmission method, for effectively performing compression and development, has a defect in which original data cannot be perfectly reproduced to deteriorate data itself.

As mentioned above, in the conventional ink-jet printing method, each of methods performs the improvement of printing quality and the high speed process of printing velocity. However, printing quality and printing velocity cannot be relative to data transmission velocity.

For example, when a printing apparatus receives high resolution data for the improvement in printing quality, it relatively takes long transmission time. As a result, a printing head of the printing apparatus stops and waits during receiving time to deteriorate the efficiency of the printing system as a whole.

Further, in the multi-pass printing method performing printing by thinning dot for printing to complementarily print at several scannings, as above, the waiting state of the printing head generates the fluctuation in printing density to deteriorate printing quality.

SUMMARY OF THE INVENTION

An object of the present invention is to decrease a waste of time in the printing system by obtaining the most suitability of printing data formation, data transmission, and printing operation in accordance with printing modes according to a plurality of printing velocities.

As a result, a primary object of the present invention is to provide printing apparatus and printing method, which are able to keep the balance of printing quality in a printing system in which both data transmission velocity and printing velocity are relative to each other, thereby improving the efficiency of the printing system as a whole.

In a first aspect of the present invention, there is provided a printing apparatus performing printing on a printing medium by controlling the driving of a printing head according to received data, the apparatus comprising:

distinction means for distinguishing data compression rate of the received data;

mode selection means for selecting a printing mode according to slow printing velocity when the data compression rate is low and selecting a printing mode according to fast printing velocity when the data compression rate is high; and control means for setting the printing head at printing velocity according to the selected printing mode.

In a second aspect of the present invention, there is provided a printing apparatus performing printing on a printing medium by controlling the driving of a printing head according to received data, the apparatus comprising:

distinction means for distinguishing information content per unit area of the received data;

mode selection means for selecting a printing mode according to slow printing velocity when the information content per unit area is large and selecting a printing mode according to fast printing velocity when the information content per unit area is small; and control means for setting the printing head at printing velocity according to the selected printing mode.

In a third aspect of the present invention, there is provided a printing method performing printing on a printing medium by controlling the driving of a printing head according to received data, the method comprising the steps of:

distinguishing data compression rate of the received data;

selecting a printing mode according to slow printing velocity when the data compression rate is low and controlling the driving of the printing head at printing velocity according to the selected printing mode to perform printing on the printing medium; and selecting a printing mode according to fast printing velocity when the data compression rate is high and controlling the driving of the printing head at printing velocity according to the selected printing mode to perform printing on the printing medium.

In a fourth aspect of the present invention, there is provided a printing method performing printing on a printing medium by controlling the driving of a printing head according to received data, the method comprising steps of:

distinguishing information content per unit area of the received data;

selecting a printing mode according to slow printing velocity when the information content per unit area is large and controlling the driving of the printing head at printing velocity according to the selected printing mode to perform printing on the printing medium; and selecting a printing mode according to fast printing velocity when the information content per unit area is small and controlling the driving of the printing head at printing velocity according to the selected printing mode to perform printing on the printing medium.

In a fifth aspect of the present invention, there is provided a printing controlling system transferring data from a host apparatus to a printing apparatus, and performing printing on a printing medium by controlling the driving of a printing head of the printing apparatus, the system printing the data including predetermined data compression rate on the printing medium by moving the printing head at printing velocity according to selected printing mode, wherein the host apparatus comprising:

mode selecting means for selecting printing mode according to data compression rate and printing velocity of the printing head;

the printing apparatus comprising:

receiving means for receiving the data including predetermined data compression rate according to the selected printing mode; and control means for setting the printing head at printing velocity according to the selected printing mode.

In a sixth aspect of the present invention, there is provided a printing controlling system transferring data from a host apparatus to a printing apparatus, and performing printing on a printing medium by controlling the driving of a printing head of the printing apparatus, the system printing the data including predetermined information content per unit area on the printing medium by moving the printing head at printing velocity according to selected printing mode, wherein, the host apparatus comprising:

mode selection means for selecting printing mode according to information content per unit area and printing velocity of the printing head;

the printing apparatus comprising:

receiving means for receiving the data including predetermined information content per unit area; and control means for setting the printing head at printing velocity according to the selected printing mode.

In a seventh aspect of the present invention, there is provided a printing medium memorizing a program for controlling the driving of the printing head of a printing apparatus, the program comprising the steps of:

distinguishing data compression rate of the data transferred from a host apparatus to the printing apparatus;

selecting a printing mode according to slow printing velocity when the data compression rate is low and controlling the driving of the printing head at printing velocity according to the selected printing mode to perform printing; and selecting a printing mode according to fast printing velocity when the data compression rate is high and controlling the driving of the printing head at printing velocity according to the selected printing mode to perform printing.

In an eighth aspect of the present invention, there is provided a printing medium memorizing a program for controlling the driving of the printing head of a printing apparatus, the program comprising the steps of:

distinguishing information content per unit area of the data;

selecting a printing mode according to slow printing velocity when the information content per unit area is large and controlling the driving of the printing head at printing velocity according to the selected printing mode to perform printing; and selecting a printing mode according to fast printing velocity when the information content per unit area is small and controlling the driving of the printing head at printing velocity according to the selected printing mode to perform printing.

The above and other objects, effects, features and advantages of the present invention will become more apparent from the following description of embodiments thereof taken in conjunction with the accompanying drawings.

DESCRIPTION OF THE PREFERRED EMBODIMENTS

Preferred embodiments of the present invention will be described in detail with reference to the drawings.

The first embodiment of the present invention will be described with reference to FIGS. 1 to 6.

First, the structure of the apparatus will be described with reference to FIGS. 8 to 10.

Figure 8:
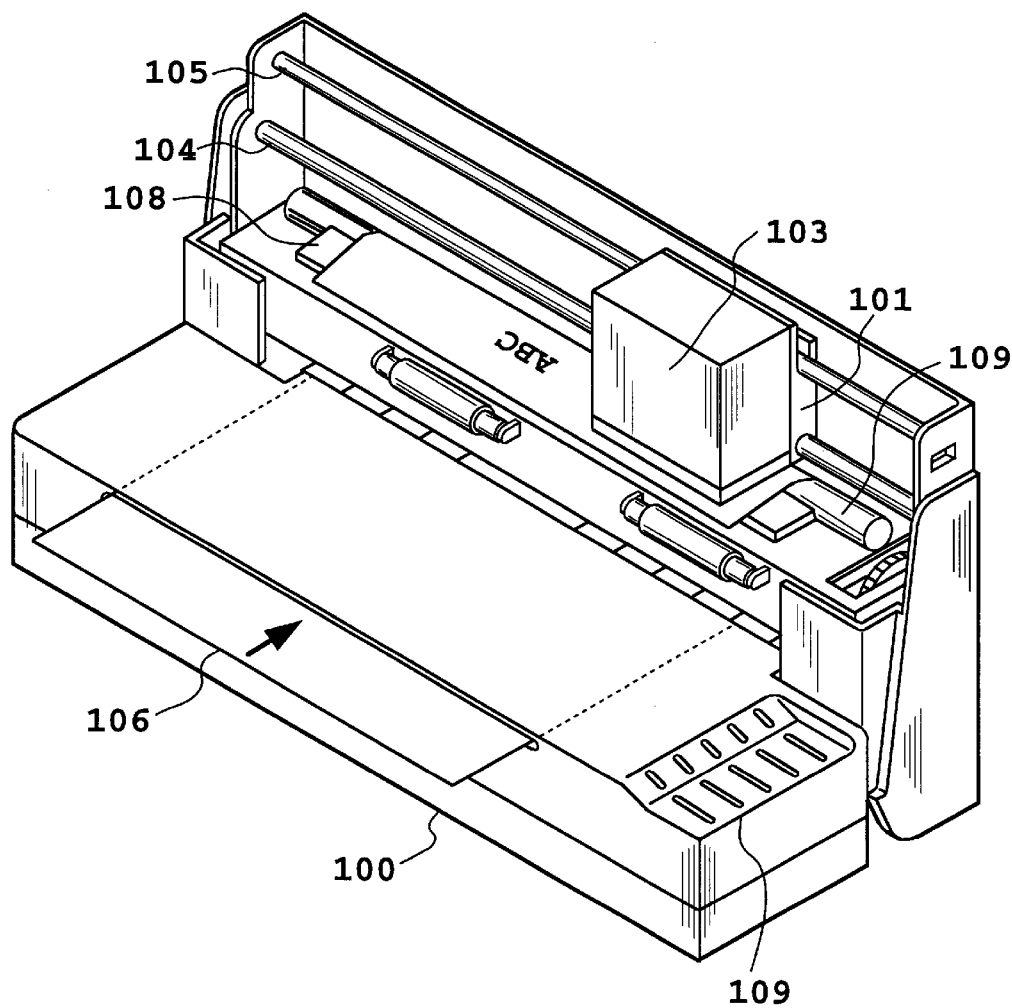
FIG. 8 is a perspective view for showing the external appearance of a printing apparatus.

FIG. 8 shows an ink-jet printing apparatus as an example of the present invention.

The printing medium 106 which is set at a feed position of the printing apparatus 100 is transported to a printing area of the printing head unit 103 by the feed roller 109. The platen 108 is set at the under portion of the printing medium 106 in the printing area. The carriage 101 is able to move to a predetermined direction by the guide axes 104 and 105, and performs the forward and backward scanning in the printing area. The carriage 101 is equipped with the printing head unit 103 including the ink tanks for supplying four kinds of color inks and the printing heads for ejecting color inks.

In the example, color inks can be black (Bk), cyan (C), magenta (M), and yellow (Y). A reference numeral 107 denotes a switch and a display panel which sets up each of printing modes and displays the state of the printing apparatus.

Figure 9:
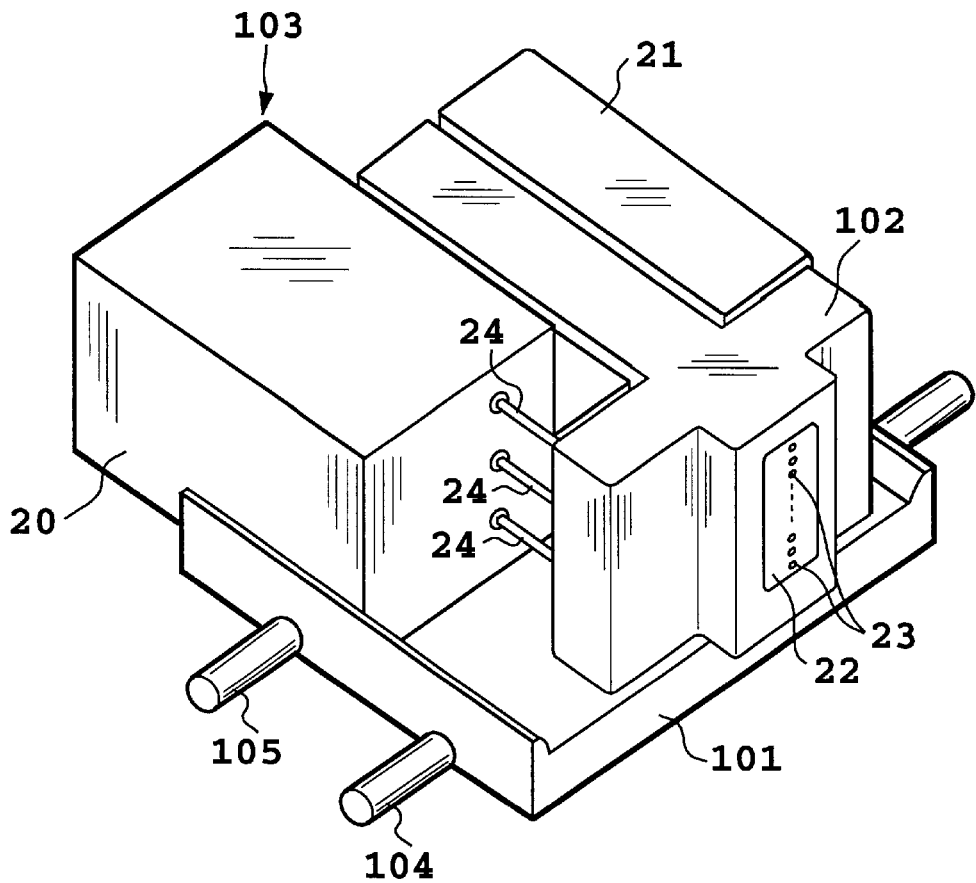
FIG. 9 is a perspective view for showing the external appearance of a printing head unit.

FIG. 9 shows the structure of the printing head unit 103.

The black ink tank 21 storing Bk ink and the color ink tank 20 storing three kinds of color inks are structured in a body and are connected to each of the printing heads 102 via the pipes 24, and each of inks is applied to each of the printing heads 102. A plurality of the ejection openings 23 according to each color (Bk, C, M, and Y) are formed in line on the ejection opening face 22. Here, the printing head 102 of each color includes 32 ejection openings 23 which are directly arranged at the density of 360 dpi (dot per inch) and each color line is formed at 8 dots (=1 pitch) intervals.

As mentioned in the present example, the ink-jet printing apparatus proposes a method in which the electric-heat converter according to an ink liquid pass (=nozzle) is arranged and the driving signal according to printing information is applied to the electric-heat converter to eject ink from the nozzle.

Figure 10:
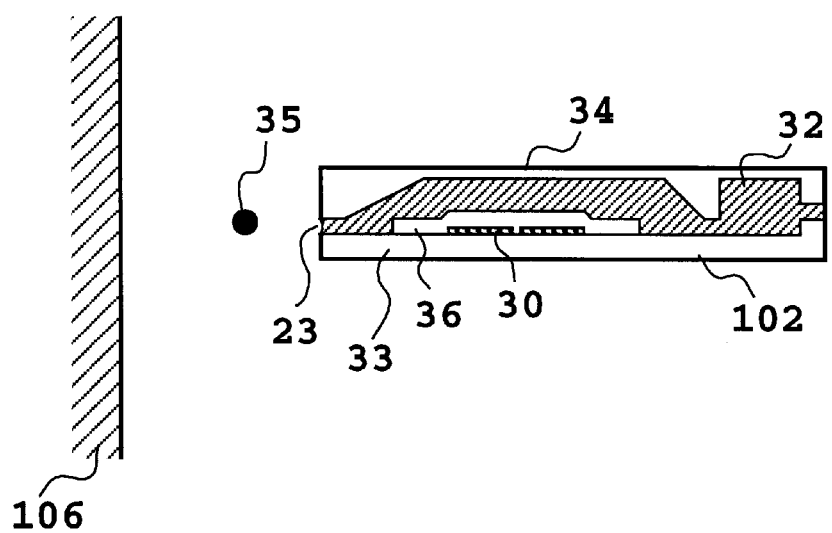
FIG. 10 is a sectional view for showing a printing head.

FIG. 10 is a large sectional view for showing the electric-heat converter of the printing head 102.

A heater 30 as the electric-heat converter of the printing head 102 corresponds to individually all of the nozzles for heating. The ink in the nozzle rapidly heated by the heater 30 boils membranes to generate bubbles and the ink droplet 35 is ejected onto the printing medium 106 by the pressure due to the bubbles and then a character or an image can be formed on the printing medium 106. The volume of the ink droplet 35 at every color is about 40 ng.

The ink liquid path according to each of the ejection openings 23 provides the heater 30 as the electric-heat converter generating heat energy utilized for ejecting the ink droplet 35 and provides an electric pole line for supplying electric power to the heater 30. The heater 30 and the electric pole line are formed on the base 33 made of silicon, and so forth, by using a membrane technique.

The protection membrane 36 is formed on the surface of the heater 30 for not directly bringing ink into contact with the heater 30. Further, the partition wall 34 made from resin and glass material are successively formed on the base 33 to structure ejection opening 23, the ink liquid path, the common liquid house 32, and the like.

As above, the printing method using the electric-heat converter is called a bubble-jet printing system in which printing can be performed by generating a bubble due to heat energy.

Next, the structure of the ink-jet printing apparatus applied to the present invention will be described with reference to FIG. 1.

The data of characters or images for printing, in other words, printing data is transferred from the host computer 500 to the receiving buffer 401 of the printing apparatus 400. On the contrary, the data for confirming whether data is correctly transferred or not and the data for informing the moving state of the printing apparatus 400 are transferred from the printing apparatus 400 to the host computer 500.

The data of the receiving buffer 401, under the control of the CPU 402, is transferred to the memory part 403 and is temporarily memorized in the RAM (Random Access Memory).

The mech (=mechanical)-controlling part 404 moves the mech-part 405 including a carriage motor and a line feed motor, and the like, according to the signal from the CPU 402. The signal from the sensor/SW controlling part 407 including the various kinds of sensors and the SW (switch) is transferred from the sensor/SW controlling part 406 to the CPU 402.

The display element controlling part 408 controls the display elements structured by the LED of the display panel group according to the signal from the CPU 402. The printing head controlling part 410 controls the printing head 102 according to the signal from the CPU 402 and detects thermal information, and the like, indicating the state of the printing head 102, and the thermal information is transferred to the CPU 402.

The distinction apparatus 430 distinguishes each of the data compression rates according to a plurality of data received by the receiving buffer 401 of the printing apparatus 400 from the host computer 500.

The mode selection apparatus 440 includes a plurality of printing modes differing from the maximum printing velocity (which is not dependent on data transmission but is dependent on mechanical movement) per page and is able to select one from among the printing modes.

Namely, the mode selection apparatus 440 can select a printing mode according to the slow printing velocity when the data compression rate is low and can select a printing mode according to the fast printing velocity when the data compression rate is high. In other words, a printing mode according to the slower printing velocity can be selected as the data compression rate is the lower.

In the system, the mode selection apparatus 501 according to the mode selection apparatus 440 is comprised in the host computer 500, too. In this case, the mode selection apparatus 501 can select a printing mode according to data compression rate and printing velocity of the printing head 102. Thus, when a printing mode is selected, the printing head 102 of the printing apparatus 400 is set up the printing velocity according to the selected printing mode. The receiving buffer 401 of the printing apparatus 400 receives the data including the predetermined data compression rate according to the selected printing mode form the host computer 500.

Next, printing movement will be described as follows.

This example can provide a method in which the printing apparatus 400 including the distinction apparatus 430 and the mode selection apparatus 440 selects a printing mode, and can provide a method in which the printing apparatus 400 selects a printing mode by the signal from the host computer 500 including the mode selection apparatus 501. It will be stated that a printing mode can be selected by the signal from the host computer 500 as follows.

First, a printing mode is selected by the signal from the host computer 500. In this example, a plurality of printing modes mean multi-pass printing mode (the number of printing passes Np: positive integer) including three kinds of printing modes, that is to say, 1-pass printing mode, 2-pass printing mode, and 3-pass printing mode. Here, Np-pass printing mode is a printing process in which the printing the printing medium 106 and the printing head 102 are relatively scanned Np times, for the printing movement of the same printing area, to sequentially perform printing.

Figure 2:
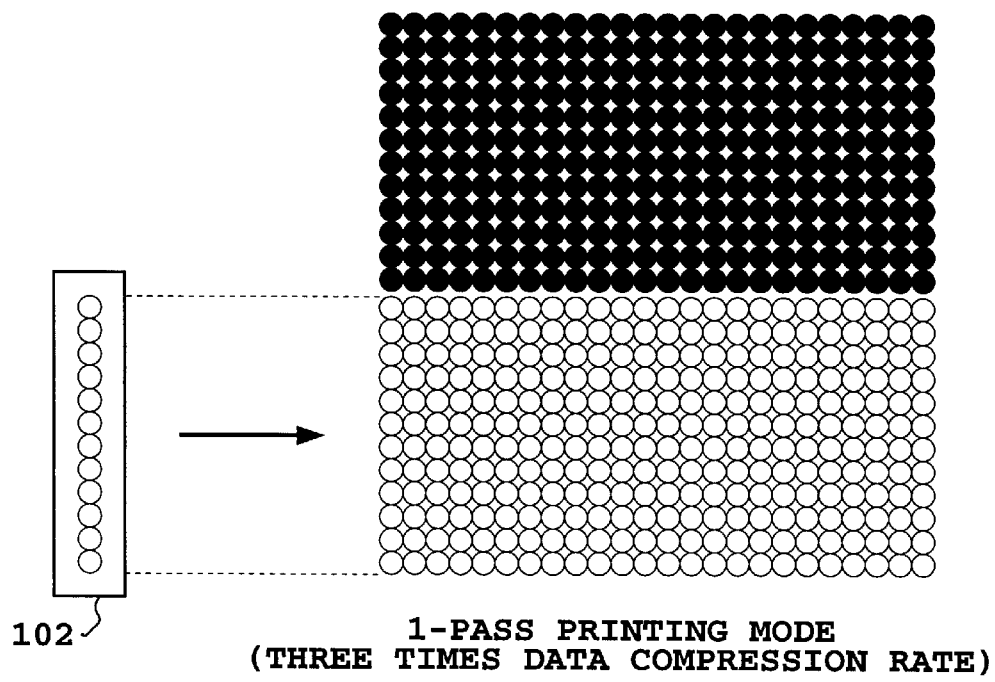
FIG. 2 is an example of multi-pass printing for showing printing process at 1-pass printing mode according to three times data compression rate.
Figure 3:
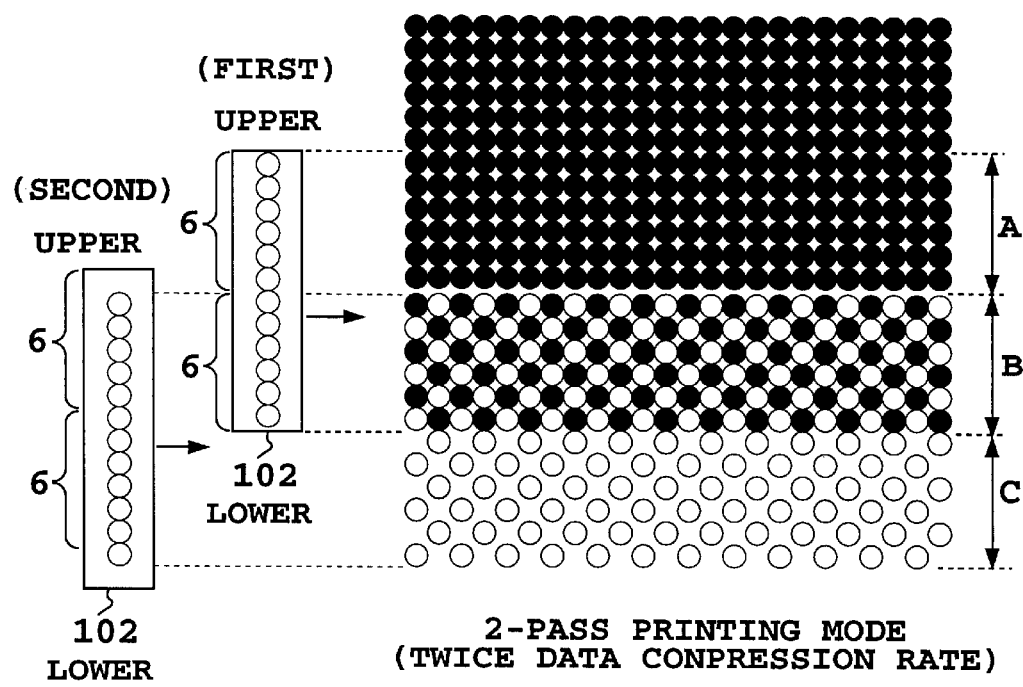
FIG. 3 is an example of multi-pass printing for showing printing process at 2-pass printing mode according to twice data compression rate.
Figure 4:
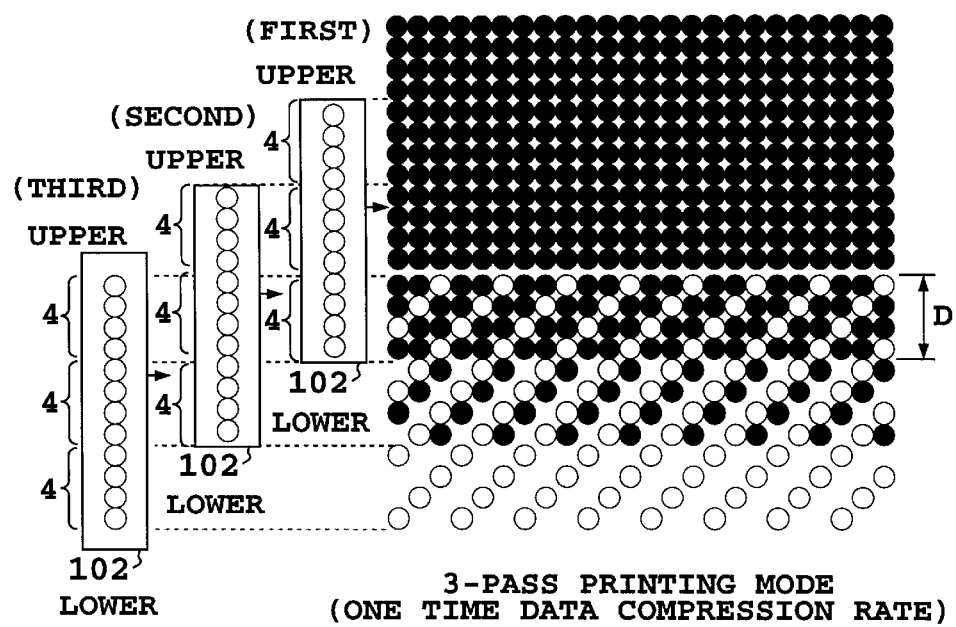
FIG. 4 is an example of multi-pass printing for showing printing process at 3-pass printing mode according to one time data compression rate.

FIGS. 2 to 4 show printing processes when the number of printing passes Np is 1, 2, and 3. The example of the printing head including the number of nozzles according to 12 will be described with reference to FIGS. 2 to 4.

FIG. 2 shows 1-pass printing mode when Np is 1 and FIG. 3 shows 2-pass printing mode when Np is 2 and FIG. 4 shows 3-pass printing mode when Np is 3. Printing data corresponds to printing process for covering all of printing areas. A block point is a pixel which is already printed and a white point is a pixel which is printed by next scanning. This multi-pass printing method is a printing process for printing a neighboring pixel with not neighboring nozzle to each other in different period, thereby improving printing quality.

As shown in FIG. 2, when the selected printing mode is 1-pass printing mode, the printing data of three times data compression rate is transferred from the host computer 500 to the printing apparatus 400. In the printing apparatus 400, the compressed printing data, via the receiving buffer 401 and the memory part 403, is developed in the data development processing part 420 by the signal from the CPU 402 and then the developed data is transferred to the printing head controlling part 410. Finally, the head driving data and the control signal are transferred from the printing head controlling part 410 to the printing head 102 and then printing movement starts. Data development process can be described with reference to FIG. 6.

As shown in FIG. 3, when the selected printing mode is 2-pass printing mode, the printing data of twice data compression rate is transferred from the host computer 500 to the printing apparatus 400 and then similarly printing movement starts.

FIG. 3 shows the relative placement of the printing head 102 according to each of two printing scannings in printing area.

Namely, as shown in FIG. 3, in the first scanning, non-printing area of A part is printed by using 6 nozzles at the upper side of the printing head 102 and printing area of B part is printed by using 6 nozzles at the lower side of that.

In the second scanning, non-printing area of B part is printed by using 6 nozzles at the upper side of the printing head 102 and printing area of C part is printed by using 6 nozzles at the lower side of that.

As shown in FIG. 4, when the selected printing mode is 3-pass printing mode, the printing data of one time data compression rate, that is to say, original data is transferred from the host computer 500 to the printing apparatus 400 via or through the data development processing part 420 and then similarly printing movement starts.

As mentioned above in FIG. 3, similarly, FIG. 4 shows the relative placement of the printing head 102 according to each of three printing scannings in printing area.

In this 3-pass printing mode, printing process is performed by finishing three printing scannings in the predetermined printing area. Namely, as shown in FIG. 4, in printing area D, printing process at first scanning is performed by using 4 nozzles at the lower side of the printing head 102, and printing process at second scanning is performed by using 4 nozzles at the middle side of the printing head 102, and printing process at third scanning is performed by using 4 nozzles at the upper side of the printing head 102 to finish printing process according to printing area D.

Next, this example in which the number of nozzles per each of colors (Y, M, C, and Bk) is 32 for color printing and the carriage 101 performs printing by the forward and backward movement will be described by each of printing modes.

The required time according to one scanning for printing 8 inches width is about 0.8 sec $\{=(8\times360)/(4.8\times10^3)+0.2\}$ on condition that each of nozzles ejects ink at about 4.8 kHz in 360 dpi and return time to the home position of the carriage 101 is 0.2 sec.

Therefore, printing data content per four colors is at the maximum about 46 k byte $\{=(32\times4\times8\times360)/8\}$ at a condition of one scanning and 8 inches width.

Data transmission velocity at each of printing modes:

(A) Three times data compression rate at 1-pass printing mode.

$$46/3/(0.8\times1)=19.2 \text{ k byte/sec}$$

(B) Twice data compression rate at 2-pass printing mode.

$$46/2/(0.8\times2)=14.4 \text{ k byte/sec}$$

(C) One time data compression rate at 3-pass printing mode.

$$46/1/(0.8\times3)=19.2 \text{ k byte/sec}$$

Here, the printing process of the present invention will be compared with the conventional printing process as follows.

In the conventional printing process, the printing mode according to printing velocity and data compression rate do not always correspond to each other. Thus, for example, when multi-pass printing performs printing at twice data compression rate, transmission velocity is 28.8 k byte/sec at 1-pass printing mode and is 14.4 k byte/sec at 2-pass printing mode and is 9.6 k byte/sec at 3-pass printing mode.

As shown in Table 1, a result of comparison will be described.

TABLE 1

| | present invention | conventional | printing time | printing quality |
|---|---|---|---|---|
| data transmission velocity (k byte/sec) (1-pass printing mode) | 19.2 | 28.8 | fast | low |
| data transmission velocity (k byte/sec) (2-pass printing mode) | 14.4 | 14.4 | middle | middle |
| data transmission velocity (k byte/sec) (3-pass printing mode) | 19.2 | 9.6 | slow | high |

As mentioned in Table 1, in the conventional example, data transmission velocity according to the number of printing passes is largely different to each other to cause a defect as follows.

For example, in a printing apparatus having the data transmission velocity according to 3-pass printing mode, data transmission is not in time at 1-pass printing mode. In a printing apparatus having data transmission velocity according to 1-pass printing mode, data transmission is enough time at 3-pass printing mode.

As a result, it is difficult to design a printing apparatus according to several printing modes and a cost for it is increased.

On the contrary, in the present example, the data transmission velocity is 14.4 to 19.2 k byte/sec at 1, 2, and 3-pass printing mode and is approximately equal to each mode. Therefore, it is possible to provide a printing apparatus which is well-balanced in a system between printing velocity and data transmission.

The higher the data compression rate is, the bigger the difference between the developed data and the original data. Therefore, the higher the data compression rate is, the less inferior printing quality.

The more a number of scannings increase, the higher printing quality is. On the other hand, a sacrifice of printing quality can be allowed in response to a demand for high speed printing and a sacrifice of printing velocity can be allowed in response to a demand for high quality printing.

Consequently, in the present example, high speed printing can be performed by high data compression rate and a small number of scannings, and high quality printing can be performed by low data compression rate and a large number of scannings, and then each of printing modes can be compatible.

Next, data compression process will be described as follows.

In the present example, data compression process is a method in which n×m (n, m: one is an integer above 1, the other is an integer above 2) pixels are replaced by numerical value and data compression rate is k (k: an integer above 2) times.

FIG. 5 is a schematic view for showing data compression process as the present example. The minimum block (=mass) shows the minimum printing pixel. A block point shows a printing dot of ink droplet. A numeral of the upper position shows a printing level in n×m pixels.

Figure 5A:
FIGS. 5A to 5C are schematic views for showing data compression process.

FIG. 5A is an example on condition that data compression rate is one time at 1×1 pixel, n=1, m=1.

Figure 5B:
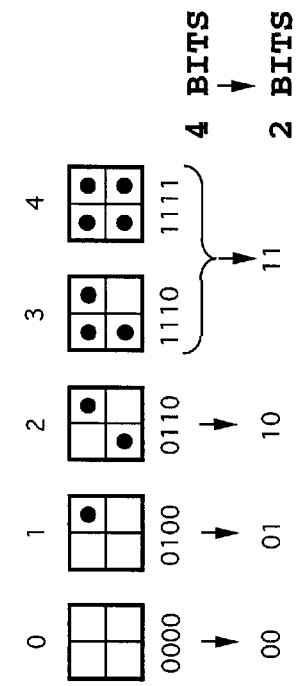

FIG. 5B is an example on condition that data compression rate is twice at 2×2 pixels, n=2, m=2.

Figure 5C:
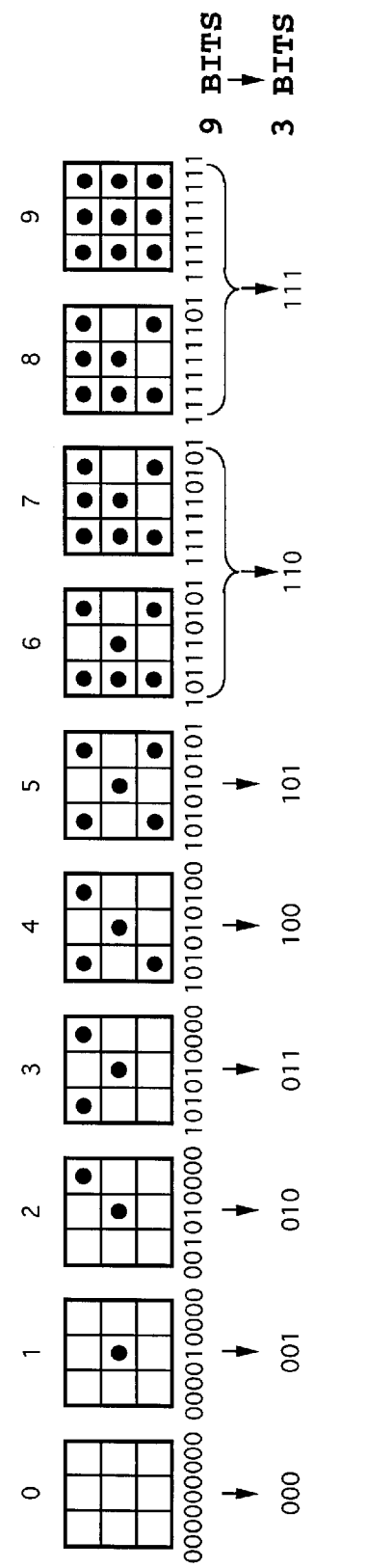

FIG. 5C is an example on condition that data compression rate is three times at 3×3 pixels, n=3, m=3.

FIG. 5A is a conventional method for making distinction between 2 levels of 0 and 1.

FIG. 5B is the present method for making distinction between 5 levels of 0 to 4 inclusive. 4 bits are necessary for information content in order to accurately show the state of each pixel. Here, 4 bits are compressed into 2 bits as written arrow below. Since data compression rate is twice, data transmission time can be a half.

In this case, however, two kinds of data degradations will be occurred.

First data degradation occurs as follows.

For example, there are four cases in the state of level 1 according to which of four blocks should be printed. In this data compression method, the right above block is always printed when the data is developed, even though every block should be printed in 2×2 blocks. Similarly, the state of level 2 can be performed.

Second data degradation occurs as follows.

The states of level 3 and level 4 are converted into similar level. The difference of printing density between the state of level 3 and that of level 4 may macroscopically be regarded as small but can microscopically be regarded as large due to the different data to each other, thereby generating data degradation.

These two kind of data degradations are microscopically regarded as data degradations but are not macroscopically regarded as that. Further, the higher printing resolution, the lower data degradation. The problem of these data degradations can be solved so that the maximum image quality is not required at relatively high speed printing mode.

FIG. 5C is a present method for making distinction between 10 levels of 0 to 9 inclusive. 9 bits are necessary for information content in order to accurately show the state of each pixel. Here, 9 bits are compressed into 3 bits as written arrow below. Since data compression rate is three times, data transmission time can be one third. Detailed explanation can similarly be performed as mentioned in FIG. 5B.

As mentioned above, the higher data compression rate, the smaller transmission data content and transmission time but the lower the reappearance according to the original data.

In the present example, by using these features, each of the printing modes corresponds to data compression rate as follows (A) to (C).

(A) Three times data compression rate at 1-pass printing mode as shown in FIG. 5C.

(B) Twice data compression rate at 2-pass printing mode as shown in FIG. 5B.

(C) One time data compression rate at 3-pass printing mode as shown in FIG. 5A.

A method for compressing printing data is not limited to the above present method but can be applied to other methods.

Further, in the present example, printing modes according to a plurality of printing velocities are not limited to the multi-pass printing method but can be applied to other printing method for improving printing quality.

For instance, the driving frequency of the printing head can be used as parameter of printing mode. In this way, the lower the driving frequency, the more stable the ejection of ink droplet to form uniform droplet. Further, the lower the velocity of relative movement between the printing head and the printing medium, the more accurate the adhesion placement of ink droplet to improve printing quality.

A transformation example of the first embodiment of the present invention will be described as follows.

Here, then, two kinds of printing modes can be shown as the simplest example.

(A) Twice data compression rate at 1-pass printing mode as shown in FIG. 5B.

(B) One time data compression rate at 2-pass printing mode as shown in FIG. 5A.

Another example can be shown as follows.

(A) Three times data compression rate at 1-pass printing mode as shown in FIG. 5C.

(B) One time data compression rate at 3-pass printing mode as shown in FIG. 5A.

As above, by combining the lower data compression rate with printing mode according to the slower printing velocity, it is able to keep the balance of printing quality in a system in which both data transmission velocity and printing velocity are relative to each other, thereby improving the efficiency of printing system as a whole.

Next, data development process will be described as follows.

Figure 6A:
FIGS. 6A to 6C are schematic views for showing data development process.
Figure 6B:
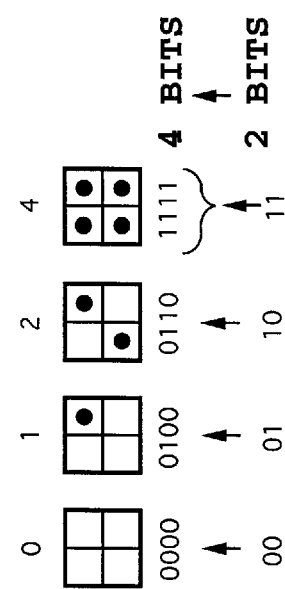
Figure 6C:
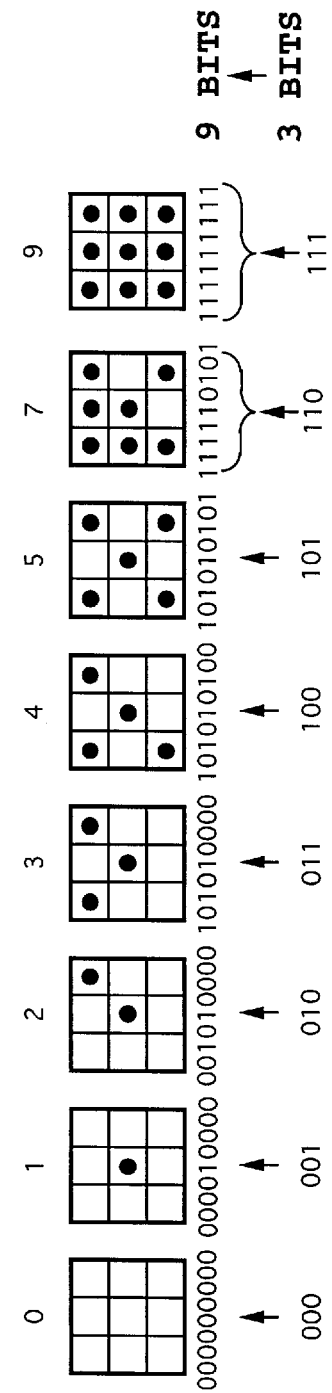

FIGS. 6A to 6C are schematic views for showing data development process. FIG. 6A is non-compression, that is to say, one time data compression rate and FIG. 6B is twice data compression rate and FIG. 6C is three times data compression rate.

Since data compression rate is twice in the preceding printing process of FIG. 3, data development process can be performed as shown in FIG. 6B, and printing process can be performed at 2-pass printing mode. In this case, the data development processing part 420 (as shown in FIG. 1) can perform data development process. Namely, in this development process, 2 bits can develop into 4 bits (2×2 dot placement).

Further, in the data development processing part 420, the data only for printing at next scanning is selected among the developed data by using a mask dividing the developed data into the data for printing at next scanning and the data for non-printing at next scanning. However, all of the data at 1-pass printing mode is always selected.

The selected printing data for printing at next scanning according to all nozzles is developed in the memory part 411 of the data head controlling part 410. The memory part 411 can memorize data content for one scanning in main scanning direction according to all nozzles.

In 2-pass printing mode as shown FIG. 3, the mask is formed in staggered fashion.

The staggered mask is used at first scanning and the reverse staggered mask is used at second scanning.

The memorized data in the memory part 411 of the data head controlling part 410 is outputted in the equivalent period according to main scanning, by the printing head 102 to eject inks from the printing head 102.

However, data development processing will be described with reference to FIG. 6B.

2 bits data "11" is developed into 4 bits data "1111." Here, as shown in data compression processing of FIG. 5B, both 4 bits data "1110" and 4 bits data "1111" are converted into 2 bits data "11." On the contrary, in the present data development processing, when 2 bits data is developed into 4 bits data, any of the data is converted into 4 bits data "1111" so that it is not appear as data whether 2 bits data "11" corresponds to 4 bits data "1110" or 4 bits data "1111."

In the 2×2 matrices, data degradation will be occurred similarly as shown in data compression processing but can be solved in an image as a whole. In this case, transmission rate according to data compression will be improved. Data development processing according to three times data compression rate can similarly be explained as shown in FIG. 6C.

In the present example, as mentioned in FIG. 6B, 2 bits data "11" is developed into 4 bits data "1111." However, 4 bits original data "1110" is converted into 4 bits data "1111" and printing process is performed, and then printing density is considered as a little higher. Therefore, for example, when 2 bits data "11" is developed, converting process may be performed by generating both 4 bits data "1110" and data "1111" at predetermined rate or by generating both those data at random.

Figure 7:
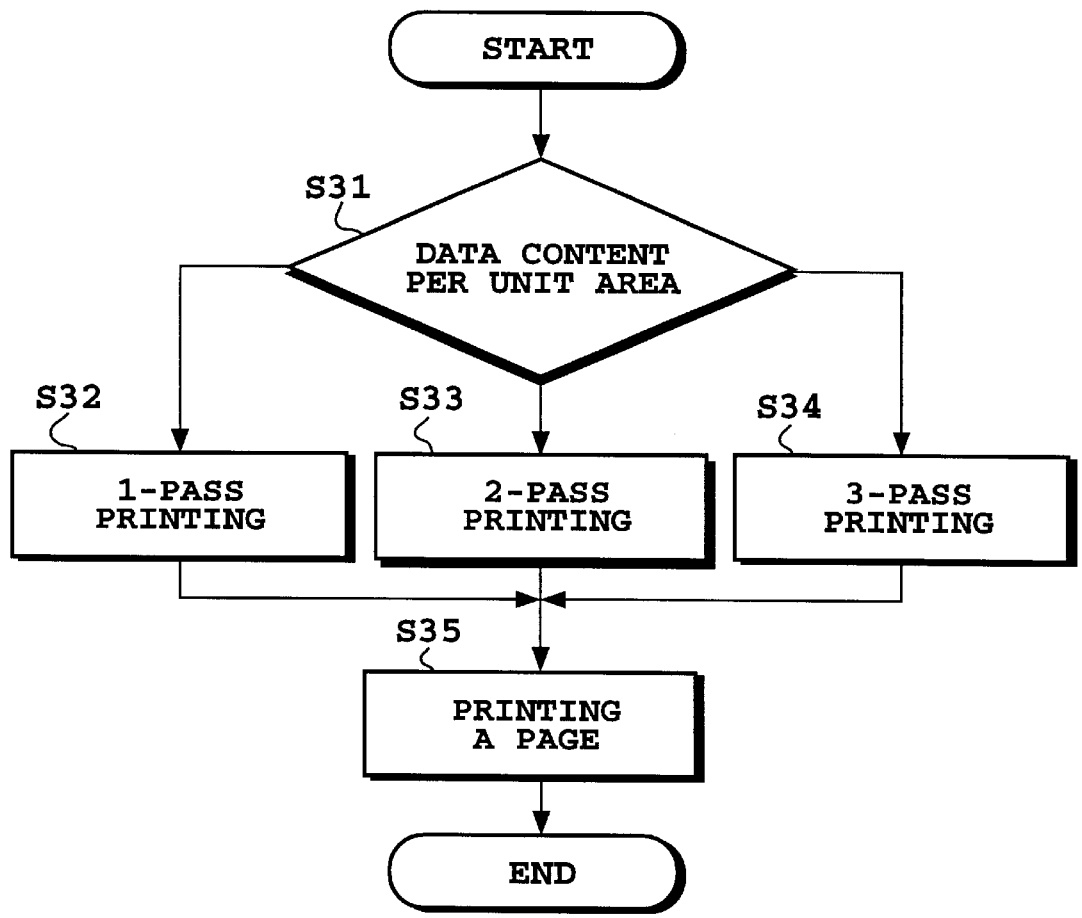
FIG. 7 is a flowchart for showing printing process as a second embodiment according to the present invention.

Next, the second embodiment of the present invention will be described with reference to FIGS. 1 and 7.

As mentioned in the preceding example of the present invention, printing mode corresponds to data compression rate of printing data.

The present example provides a printing method in which the printing apparatus 400 including printing modes according to a plurality of printing velocities can select a printing mode according to information content per unit printing area in printing data.

Figure 1:
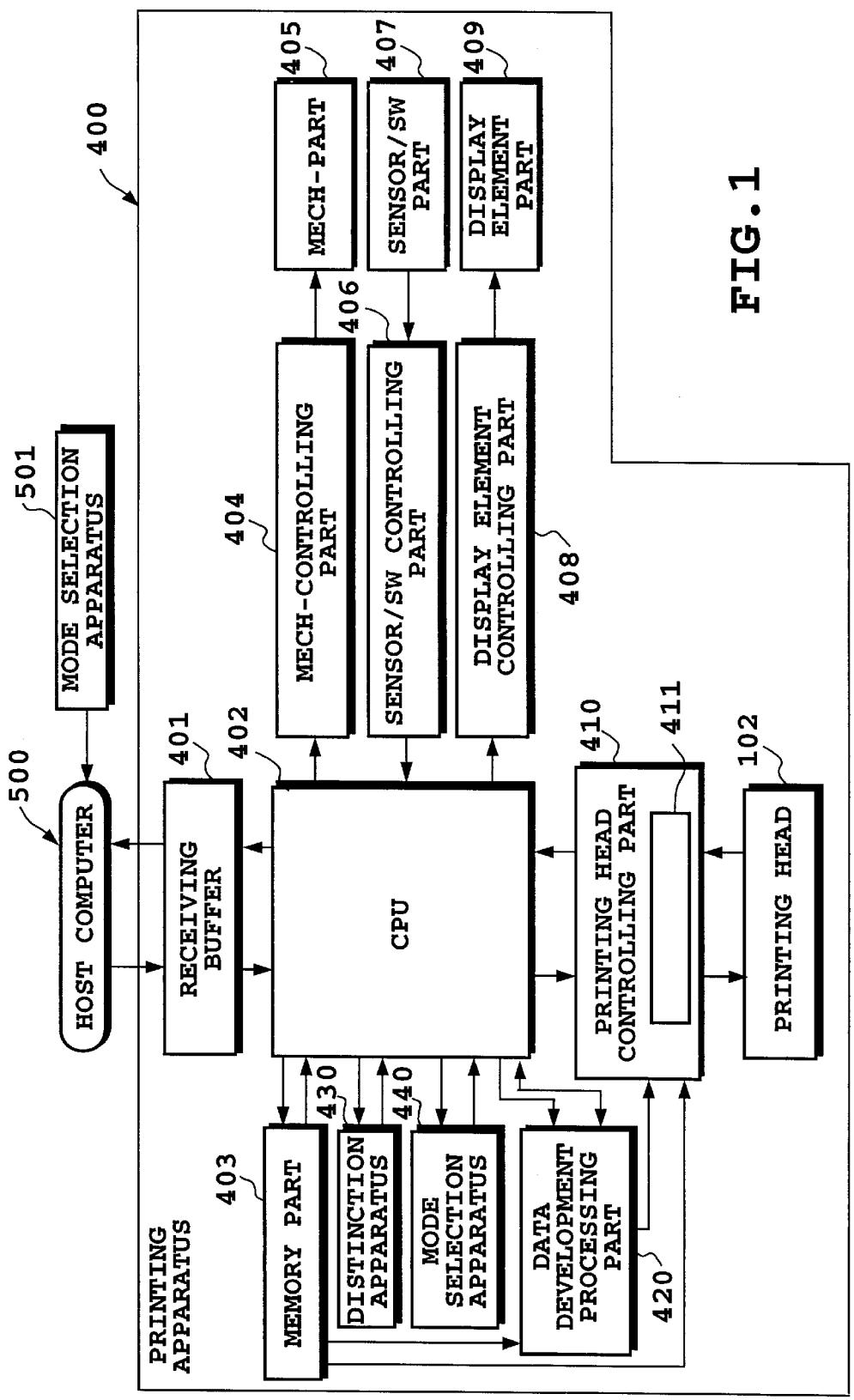
FIG. 1 is a schematic view for showing the structure of a printing apparatus as a first embodiment according to the present invention.

As shown in FIG. 1, the distinction apparatus 430 can distinguish information content per unit printing area in a plurality of printing data. The mode selection apparatus 440 can select a printing mode according to the slower printing velocity when printing data contain a great deal of information content per unit printing area and can select a printing mode according to the faster printing velocity when printing data contain a little information content per unit printing area.

First, information content per unit printing area in printing data, namely, data transmission content (−transmission time) is transferred from the host computer 500 to the printing apparatus 400. Next, the printing apparatus 400 selects a printing mode according to information content per unit printing area.

That is to say, the distinction apparatus 430 distinguishes information content per unit printing area and the mode selection apparatus 440 selects printing mode according to the distinguished information content. Here, information content per unit printing area is, for instance, printing data per page at the size of an A4 general paper.

Thus, the printing apparatus 400 selects a printing mode according to information content per unit printing area to appropriately keep the balance of data transmission time and printing time. For example, the printing apparatus 400 performs printing at high speed printing mode when printing data contain a little data transmission content, and performs printing at low speed printing mode and high quality when printing data contain a great deal of data transmission content.

The condition for the balance of printing time and data transmission velocity can be established as follows.

When the printing apparatus 400 performs printing on a printing medium 11 inches long by 8 wide at the resolution of 360 dpi by using 32 nozzles, the printing time at 1-pass, 2-pass, and 3-pass, except for the time directly not relative to printing process such as setting time for the printing medium, can be summarized as follows.

1-pass printing mode:

0.8 sec×124 times=100 sec→2M byte.

2-pass printing mode:

0.8 sec×249 times=200 sec→4M byte.

3-pass printing mode:

0.8 sec×374 times=300 sec→6M byte.

As shown above, numerals at the right side of arrow, data transmission content can be calculated on condition that the average data transmission velocity is 20 k byte/sec.

Here, data transmission content per page at the size of an A4 general paper:

(data transmission content) . . . (printing mode)
(A) below 2M byte . . . 1-pass printing mode
(B) not less than 2M byte nor more than 4M byte . . . 2-pass printing mode
(C) above 4M byte . . . 3-pass printing mode The above conditions provide the most appropriate printing in a system in which there are three kinds of printing modes according to 1-pass, 2-pass, and 3-pass.

A concrete example is as follows.

(information) . . . (data transmission content)→(printing mode)
(1) data such as a character . . . 20 k byte→1-pass printing mode
(2) a mixture of a character and a graph . . . 2000 k byte→2-pass printing mode
(3) an image in all area . . . 5700 k byte→3-pass printing mode FIG. 7 is a flowchart for showing the main process of this example.

When printing process starts, the printing apparatus 400 checks printing data content per unit printing area at step 31. Here, the printing apparatus 400 checks whether printing data content per page at the size of an A4 general paper 11 inches long by 8 wide is below 2M byte or whether printing data content of that is below 4M byte.

Printing process goes to step 32 on condition printing data content is below 2M byte or goes to step 33 on condition it is not less than 2M byte nor more than 4M byte or goes to step 34 on condition it is above 4M byte.

1-pass printing mode is set up at step 32.
2-pass printing mode is set up at step 33.
3-pass printing mode is set up at step 34.

Printing process per page according to predetermined printing mode is performed and printing movement finishes.

After the host computer 500 finishes forming printing data per page, information content per unit printing area may be transferred from the host computer 500 to the printing apparatus 400.

Likewise, after the host computer 500 checks the summary of printing data per page, the summary of information content per unit printing area may be transferred from the host computer 500 to the printing apparatus 400.

As mentioned above, information content per unit printing area is printing data per page, and further, it may be the larger or the smaller.

The larger case corresponds to printing data per several following pages and the smaller case corresponds to printing data per several scannings of the carriage 101.

The former (=larger case) is available to consistently print the continuous documents. The latter (=smaller case) is available to perform multi-pass printing with increase of the number of Np for only the increased area of data transmission content per page, thereby being possible to scrupulously control. In each example, numeral as parameter is a matter for design and can be suited for each printing system.

As mentioned above, the printing apparatus 400 including printing modes according to a plurality of printing velocities can select a printing mode according to information content per unit printing area in printing data, thus improving the efficiency of printing system as a whole.

Further, as mentioned in the first embodiment, a printing mode can be selected by the signal transferred from the mode selection apparatus 501 of the host computer 500 to obtain the same effect.

The present invention can be applied to all kinds of apparatus using a printing medium such as a general paper used by a copier, an especial paper for ink-jet printing, a cloth, an OHP sheet, and the like. It can be shown that, concretely, the apparatus of the present invention can be applied for a printer, a copier, a facsimile, and the like.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature.

This is because in the ink jet system, the ink is generally temperature adjusted in a range of 30° C.-70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, according to the present invention, data compression rate according to each of the data is distinguished and a printing mode according to slow printing velocity is selected when data compression rate is low and a printing mode according to fast printing velocity is selected when data compression rate is high to control the driving of the printing head at printing velocity according to each selected printing mode, thereby effectively performing both high speed printing according to high data compression rate and high quality printing according to low data compression rate in a system.

As a result, it is able to keep the balance of printing quality in a system in which data transmission velocity and printing velocity are relative to each other, thus providing a printing apparatus and a printing method in which the efficiency in a printing system as a whole can be improved.

As described above, according to the present invention, information content per unit area according to each of the data is distinguished and a printing mode according to slow printing velocity is selected when information content per unit area is large and a printing mode according to fast printing velocity is selected when information content per unit area is small to control the driving of the printing head at printing velocity according to each selected printing mode.

As mentioned in data compression rate, similarly, it is able to keep the balance of printing quality in a system in which data transmission velocity and printing velocity are relative to each other, thus providing a printing apparatus and a printing method in which the efficiency in a printing system as a whole can be improved.

Further, in a system in which a printing mode of the printing apparatus can be selected by the signal transferred from the host computer, the data containing predetermined compression rate according to the selected printing mode or the data containing information content per predetermined unit area can moderately be transferred.

As a result, similarly, it is able to keep the balance of printing quality in a system in which data transmission velocity and printing velocity are relative to each other, thus providing a printing controlling system in which the efficiency in a printing system as a whole can be improved.

Needless to say, the present invention provides a method in which a memorizing medium memorized a software program for performing the preceding printing process of the above embodiments is supplied to a system or an apparatus, and the computer (CPU, MPU) of the system or the apparatus reads out a program code to perform printing process.

In this case, the program code itself read out from the memorizing medium can be performed the preceding printing process of the above embodiments and the present invention is constructed from the memorizing medium memorized the program code.

The memorizing medium for supplying the program code such as a floppy disk, a hard disk, an optical disk, an optical magnetic disk, a CD-ROM, a CD-R, a magnetic tape, a nonvolatile memory card, a ROM, and the like can be used.

And, needless to say, the present invention provides a method in which OS (Operating System) under the control of the computer actually performs a part or all of process according to the instruction of the program code read out from the computer to perform the preceding printing process of the above embodiments.

Further, needless to say, the present invention provides a method in which the program code read out from the memorizing medium is memorized in the memory being equipped with the function expansion board inserted in the computer or the function expansion unit connected to the computer, and the CPU being equipped with the function expansion board or the function expansion unit actually performs a part or all of process according to the instruction of the program code to perform the preceding printing process of the above embodiments.

However, needless to say, the present invention is not limited to the above embodiments but is applicable for all kinds of transformation examples.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such

What is claimed is:

1. A printing apparatus for performing printing on a printing medium by controlling driving of a printing head according to received data, said apparatus comprising:

a receiver, arranged for receiving data from an external apparatus, wherein the received data includes compressed data of a printing image, compressed by the external apparatus, the compressed data being different in data content according to a data compression rate;

a distinguisher, arranged for distinguishing the data compression rate of the received data;

a mode selector, arranged for selecting a printing mode according to a slow printing velocity, when the data compression rate is low, and selecting a printing mode according to a fast printing velocity, when the data compression rate is high; and a controller, arranged for setting a printing velocity of the printing head according to a printing mode selected by said mode selector, developing the received data according to the data compression rate, and performing printing based on the developed data, wherein said mode selector selects the printing mode from among a plurality of printing modes, which differentiate a number of scannings of the printing head over a predetermined area on the printing medium, and wherein the number of scannings of the printing head over the predetermined area on the printing medium, in a case of the printing mode according to the fast printing velocity, is decreased to a smaller value than that in a case of the printing mode according to the slow printing velocity.

2. The printing apparatus as claimed in claim 1, wherein the data compression rate is, at a minimum, one time.

3. The printing apparatus as claimed in claim 1,
wherein the data compression rate is determined by replacing n x m pixels with a numerical value per bit, and
wherein one of n and m is an integer greater than 1, and another of n and m is an integer greater than 2.

4. The printing apparatus as claimed in claim 3,
wherein the data compression rate is K times, and
wherein K is an integer greater than 2.

5. The printing apparatus as claimed in claim 1, wherein the printing mode includes a 1-pass printing mode for forming a predetermined image by one scanning of the printing head and a multi-pass printing mode or over 2-pass printing mode for forming a predetermined image by at least two scannings of the printing head, and the data compression rate according to the 1-pass printing mode is greater than that of the multi-pass printing mode or the over 2-pass printing mode.

6. A printing apparatus for performing printing on a printing medium by controlling driving of a printing head according to received data, said apparatus comprising:
a receiver, arranged for receiving data from an external apparatus, wherein the received data includes compressed data of a printing image, compressed by the external apparatus, and the receiver has a function for receiving the compressed data, the compressed data being different according to a data compression rate, that is transferred from said external apparatus;
a distinguisher, arranged for distinguishing an information content of the received data, based on information included in the received data, wherein the information content included in the compressed data per unit printing area of a printing medium is different according to the compression rate;
a mode selector, arranged for selecting a printing mode according to a slow printing velocity, when the information content per unit area is large, and selecting a printing mode according to a fast printing velocity, when the information content per unit area is small; and
control means for setting the printing head at a printing velocity according to the selected printing mode,
wherein said mode selector selects the printing mode from among a plurality of printing modes, which differentiate a number of scannings of the printing head over a predetermined area on the printing medium, and
wherein the number of scannings of the printing head over the predetermined area on the printing medium, in a case of the printing mode according to the fast printing velocity, is decreased to a smaller value than that in a case of the printing mode according to the slow printing velocity.

7. The printing apparatus as claimed in claim 6, wherein the information content is a data transmission content per unit printing area.

8. The printing apparatus as claimed in claim 6, wherein the information content is printing data per page at a predetermined size of the printing medium.

9. The printing apparatus as claimed in claim 6, wherein the information content is data according to all printing areas.

10. The printing apparatus as claimed in claim 6, wherein the printing head is an ink-jet head that performs printing by ejecting an ink.

11. The printing apparatus as claimed in claim 6, wherein the printing head is a head that ejects an ink utilizing thermal energy.

12. A printing method for performing printing on a printing medium by controlling driving of a printing head according to received data, said method comprising the steps of:
receiving data from an external apparatus, wherein the received data includes compressed data of a printing image, compressed by the external apparatus, the compressed data being different in data content according to a data compression rate;
distinguishing the data compression rate of the received data received from the external apparatus in said receiving step;
selecting a printing mode according to a slow printing velocity, when the data compression rate is low, and controlling the driving of the printing head for setting a printing velocity of the printing head according to the selected printing mode to perform printing on the printing medium;
selecting a printing mode according to a fast printing velocity, when the data compression rate is high, and controlling the driving of the printing head for setting a printing velocity of the printing head according to the selected printing mode to perform printing on the printing medium; developing the received data according to the data compression rate; and performing printing on the printing medium, based on the developed data, wherein a printing mode is selected from among a plurality of printing modes,
which differentiate a number of scannings of the printing head over a predetermined area on the printing medium, and
wherein the number of scannings of the printing head over a predetermined area on the printing medium, in a case of the printing mode according to the fast printing velocity, is decreased to a smaller value than that in a case of the printing mode according to the slow printing velocity.

13. The printing method as claimed in claim 12, wherein the data compression rate is, at a minimum, one time.

14. The printing method as claimed in claim 12,
wherein the data compression rate is determined by replacing nxm pixels with a numerical value per bit, and
wherein at least one of n and m is an integer greater than 1, and another one of n and m is an integer greater than 2.

15. The printing method as claimed in claim 14,
wherein the data compression rate is K times, and
wherein K is an integer greater than 2.

16. The printing method as claimed in claim 12, wherein the printing mode includes a 1-pass printing mode for forming a predetermined image by one scanning of the printing head and a multi-pass printing mode or over 2-pass printing mode for forming a predetermined image by at least two scannings of the printing head, and
the data compression rate according to the 1-pass printing mode is greater than the multi-pass printing mode or the over 2-pass printing mode.

17. A printing method for performing printing on a printing medium by controlling driving of a printing head according to received data, said method comprising the steps of:

receiving data from an external apparatus, wherein the received data includes compressed data of a printing image, compressed by the external apparatus, and the receiver has a function for receiving the compressed data, the compressed data being different according to a data compression rate, that is transferred from said external apparatus;

distinguishing an information content of the received data, based on information included in the received data, wherein the information content included in the compressed data per unit printing area of a printing medium is different according to the compression rate;

selecting a printing mode according to a slow printing velocity, when the information content per unit area is large, and controlling the driving of the printing head at a printing velocity according to the selected printing mode to perform printing on the printing medium; and selecting a printing mode according to a fast printing velocity, when the information content per unit area is small, and controlling the driving of the printing head at a printing velocity according to the selected printing mode to perform printing on the printing medium, wherein a printing mode is selected from among a plurality of printing modes, which differentiate a number of scannings of the printing head over a predetermined area on the printing medium, and wherein the number of scannings of the printing head over a predetermined area on the printing medium, in a case of the printing mode according to the fast printing velocity, is decreased to a smaller value than that in a case of the printing mode according to the slow printing velocity.

18. The printing method as claimed in claim 17, wherein the information content is a data transmission content per unit printing area.

19. The printing method as claimed in claim 17, wherein the information content is printing data per page at a predetermined size of the printing medium.

20. The printing method as claimed in claim 17, wherein the information content is data according to all printing areas.

21. A printing controlling system for transferring data from a host apparatus to a printing apparatus, and for performing printing on a printing medium by controlling driving of a printing head of said printing apparatus, said system printing data having a predetermined data compression rate on the printing medium by moving the printing head at a printing velocity according to a selected printing mode, wherein said host apparatus comprises:
mode selecting means for selecting a printing mode according to a data compression rate and a printing velocity of the printing head, and wherein said printing apparatus comprises:
a receiver, arranged for receiving, from said host apparatus, the data, including compressed data of a printing image, having the predetermined data compression rate according to the selected printing mode, the compressed data being different in data content according to the predetermined data compression rate; and a controller, arranged for setting the printing velocity of the printing head according to the printing mode selected by said mode selector, developing the received data according to the predetermined data compression rate, and causing printing to be performed based on the developed data, wherein said mode selector selects a printing mode from among a plurality of printing modes, which differentiate a number of scannings of the printing head over a predetermined area on the printing medium, and wherein the number of scannings of the printing head over a predetermined area on the printing medium, in a case of the printing mode according to a fast printing velocity, is decreased to a smaller value than that in a case of the printing mode according to a slow printing velocity.

22. A printing controlling system for transferring data from a host apparatus to a printing apparatus, and for performing printing on a printing medium by controlling driving of a printing head of said printing apparatus, said system printing the data, having a predetermined information content corresponding to a unit area of a printing medium, by moving the printing head at printing velocity according to a selected printing mode, wherein information content per unit area of a printing medium is different based on a data compression rate, wherein said printing apparatus comprises:
a receiver, arranged for receiving the data from said host apparatus, wherein the data includes compressed data of a printing image, and the receiver has a function for receiving the compressed data, the compressed data being different according to the data compression rate, that is transferred from said host apparatus;

a distinguisher, arranged for distinguishing an information content of the received data, based on information included in the received data, wherein the information content included in the compressed data per unit printing area of a printing medium is different according to the compression rate;

a mode selector, arranged for selecting a printing mode according to a slow printing velocity, when the information content is large per unit area, and for selecting a printing mode according to a fast printing velocity, when the information content per unit area is small; and a controller, arranged for setting the printing head at printing velocity according to the selected printing mode, wherein the mode selector selects a printing mode from among a plurality of printing modes, which differentiate a number of scannings of the printing head over a predetermined area on the printing medium, and wherein the number of scannings of the printing head over a predetermined area on the printing medium, in a case of the printing mode according to the fast printing velocity, is decreased to a smaller value than that in a case of the printing mode according to the slow printing velocity.

23. A printing apparatus for performing printing by controlling driving of a printing head according to received data, said apparatus comprising:

a receiver arranged for receiving the data, including compressed data of a printing image, the compressed data being different in data content according to a data compression rate;

a distinguisher arranged for distinguishing the data compression rate of the data received by said receiver, wherein the data compression rate is based on pre-compressed data;

a developer arranged for developing the data received by said receiver, according to the data compression rate;

a selector arranged for selecting one of a plurality of printing modes, wherein the selected mode corresponds to a data compression rate distinguished by said distinguisher, and the plurality of printing modes includes at least two printing modes each having a different printing time according to a predetermined area of the printing medium, the plurality of printing modes being printing modes in which a number of scannings of the printing head over a predetermined area on the printing medium are different each other; and a printing controller arranged for performing printing according to the selected printing mode, based on the data developed by said developer, wherein a selected printing mode when the data compression rate is high is faster than a selected printing mode when the data compression rate is low.

24. A printing apparatus as claimed in claim 23, wherein the data compression rate is, at a minimum, one time.

25. The printing apparatus as claimed in claim 23, wherein the data compression rate is determined by replacing n×m pixels with a numerical value per bit, wherein one of n and m is an integer greater than 1, and another of n and m is an integer greater than 2.

26. The printing apparatus as claimed in claim 25, wherein the data compression rate is K times, and wherein K is an integer greater than 2.

27. The printing apparatus as claimed in claim 23, wherein the plurality of printing modes includes a 1-pass printing mode and a multi-pass printing mode.

28. The printing apparatus as claimed in claim 23, wherein the printing head is an ink-jet head that performs printing by ejecting an ink.

29. The printing apparatus as claimed in claim 23, wherein the printing head is a head that ejects an ink utilizing thermal energy.

30. A method for performing printing by controlling driving of a printing head according to received data, said method comprising the steps of:

receiving the data including compressed data of a printing image, the compressed data being different in data content according to a data compression rate;

distinguishing the data compression rate of the received data, the data compression rate being based on pre-compressed data;

developing the received data, according to the data compression rate;

selecting one of a plurality of printing modes, wherein the selected mode corresponds to a data compression rate distinguished in said distinguishing step, and the plurality of printing modes includes at least two printing modes each having a different printing time according to a predetermined area of the printing medium, the plurality of printing modes being printing modes in which a number of scannings of the printing head over a predetermined area on the printing medium are different from each other; and performing printing according to the selected printing mode, based on the data developed in said developing step, wherein a selected printing mode when the data compression rate is high is faster than a selected printing mode when the data compression rate is low.

31. The method as claimed in claim 30, wherein the data compression rate is, at a minimum, one time.

32. The method as claimed in claim 30, wherein the data compression rate is determined by replacing n×m pixels with a numerical value per bit, wherein one of n and m is an integer greater than 1, and another of n and m is an integer greater than 2.

33. The method as claimed in claim 32, wherein the data compression rate is K times, and wherein K is an integer greater than 2.

34. The method as claimed in claim 30, wherein the plurality of printing modes includes a 1-pass printing mode and a multi-pass printing mode.

35. The method as claimed in claim 30, wherein the printing head is an ink-jet head that performs printing by ejecting an ink.

36. The method as claimed in claim 30, wherein the printing head is a head that ejects an ink utilizing thermal energy.

37. A method for controlling a printing apparatus from a host apparatus, which transfers data to the printing apparatus, said method comprising the steps of:

selecting a printing mode from among a plurality of printing modes having different printing velocities, wherein the plurality of printing modes includes at least two printing modes each having different printing times according to a predetermined area of the printing medium, the plurality of printing modes being printing modes in which a number of scannings of a printing head over a predetermined area on a printing medium are different from each other;

setting a printing velocity of a printer according to the selected printing mode, to enable printing to be performed;

compressing data, based on a data compression rate corresponding to the selected printing mode, wherein the host apparatus compresses data which is transferred from the host apparatus to the printing apparatus; and transferring the compressed data to the printer, wherein a data compression rate according to a fast printing velocity due to the set printing mode is higher than a data compression rate according to a slow printing velocity.

* * * * *